(12) United States Patent
Morrison et al.

(10) Patent No.: US 6,642,710 B2
(45) Date of Patent: Nov. 4, 2003

(54) POSITION SENSOR

(75) Inventors: Euan Morrison, Harston (GB); Peter Georg Laitenberger, Harston (GB); Ross Peter Jones, Harston (GB); Robin Michael Lee, Harston (GB); Andrew James White, Harston (GB)

(73) Assignee: Scientific Generics Limited, Cambridgeshire (GB)

(*) Notice: Subject to any disclaimer, the term of this patent is extended or adjusted under 35 U.S.C. 154(b) by 93 days.

(21) Appl. No.: 09/983,246

(22) Filed: Oct. 23, 2001

(65) Prior Publication Data

US 2002/0089326 A1 Jul. 11, 2002

Related U.S. Application Data

(63) Continuation-in-part of application No. PCT/GB00/01597, filed on Apr. 25, 2000.

(30) Foreign Application Priority Data

Apr. 23, 1999 (GB) .............................................. 9909428
Nov. 17, 1999 (GB) .............................................. 9927218

(51) Int. Cl.[7] .......................... G01B 7/00; G01R 33/025
(52) U.S. Cl. .............................. 324/207.12; 324/207.24; 324/207.17
(58) Field of Search ..................... 324/207.24, 207.25, 324/207.12, 207.17, 207.22, 223, 207.16, 207.18; 92/5 R; 336/225, 136; 340/870.31, 870.33, 870.35

(56) References Cited

U.S. PATENT DOCUMENTS

| 3,890,607 | A | | 6/1975 | Pelenc et al. |
| 4,297,698 | A | | 10/1981 | Pauwels et al. |
| 4,339,739 | A | * | 7/1982 | Dron .......................... 336/136 |
| 4,783,626 | A | | 11/1988 | Shimizu |
| 5,036,275 | A | | 7/1991 | Munch et al. |
| 5,204,621 | A | * | 4/1993 | Hermann et al. ...... 324/207.18 |
| 5,260,651 | A | | 11/1993 | Tischer et al. |
| 5,642,043 | A | * | 6/1997 | Ko et al. ................ 324/207.24 |

FOREIGN PATENT DOCUMENTS

| DE | 26 17 624 A 1 | 11/1977 |
| DE | 42 20 801 A 1 | 1/1994 |
| DE | 43 37 208 A 1 | 5/1995 |
| DE | 195 45 923 A 1 | 8/1996 |
| DE | 197 26 256 C 1 | 8/1998 |
| DE | 198 32 854 A 1 | 1/1999 |
| EP | 0 074 301 A2 | 3/1983 |
| EP | 0 422 458 A2 | 4/1991 |
| EP | 0 823 560 A1 | 2/1998 |
| FR | 2182400 | 12/1973 |
| GB | 1 256 721 | 12/1971 |
| GB | 2 021 770 | 12/1979 |
| GB | 2 095 410 | 9/1982 |
| GB | 2 151 789 | 7/1985 |

* cited by examiner

Primary Examiner—Edward Lefkowitz
Assistant Examiner—Subhash A Zaveri
(74) Attorney, Agent, or Firm—Finnegan, Henderson, Farabow, Garrett & Dunner, L.L.P.

(57) ABSTRACT

The present invention provides a position sensor which is suitable for use in a piston and cylinder assembly. The position sensor includes a movable field modifying member which is operable to vary the inductance of a sensor winding, whereby the position of the field modifying member relative to the sensor winding can be determined by monitoring the inductance of the sensor winding. The position sensor also includes a compensation winding which is arranged to have a common coupling with the field modifying member whereby a signal output from the compensation winding can be used to compensate for variations in the signal level output by the sensor winding caused by, for example, temperature variations of the system.

22 Claims, 8 Drawing Sheets

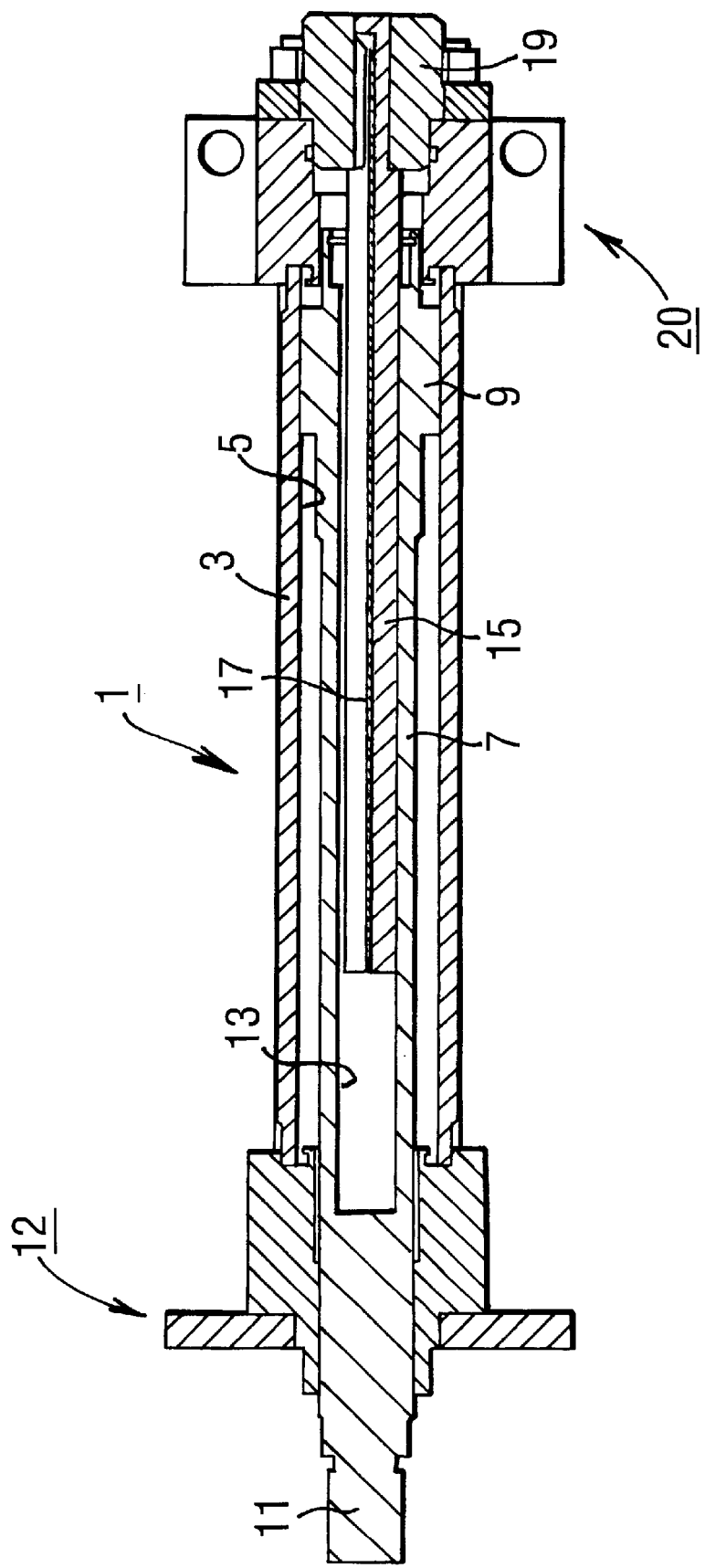

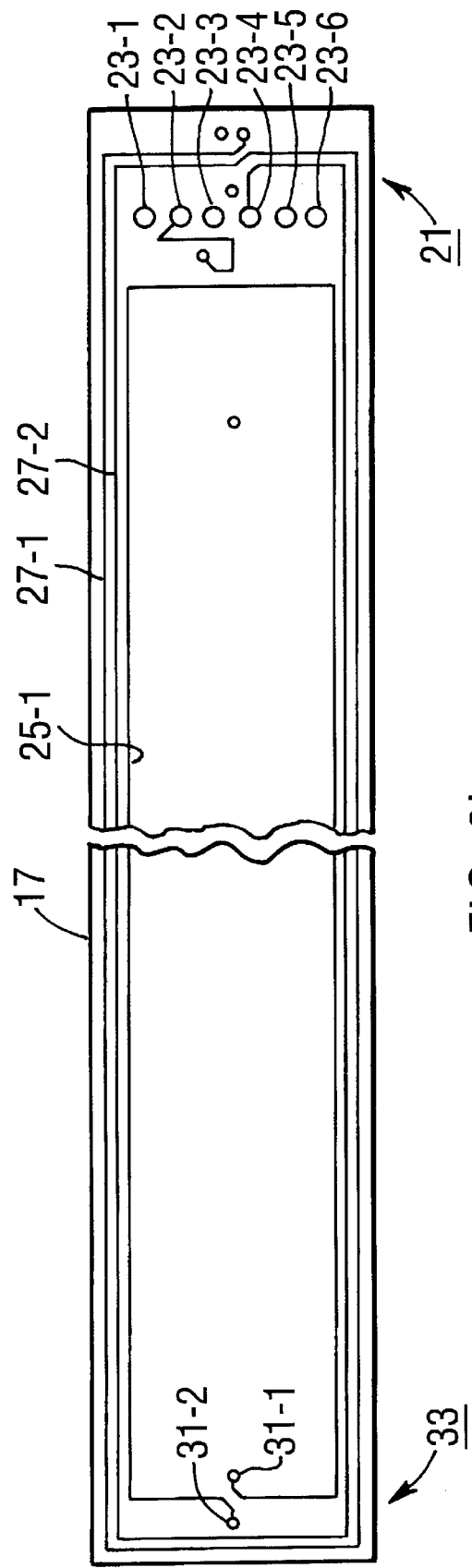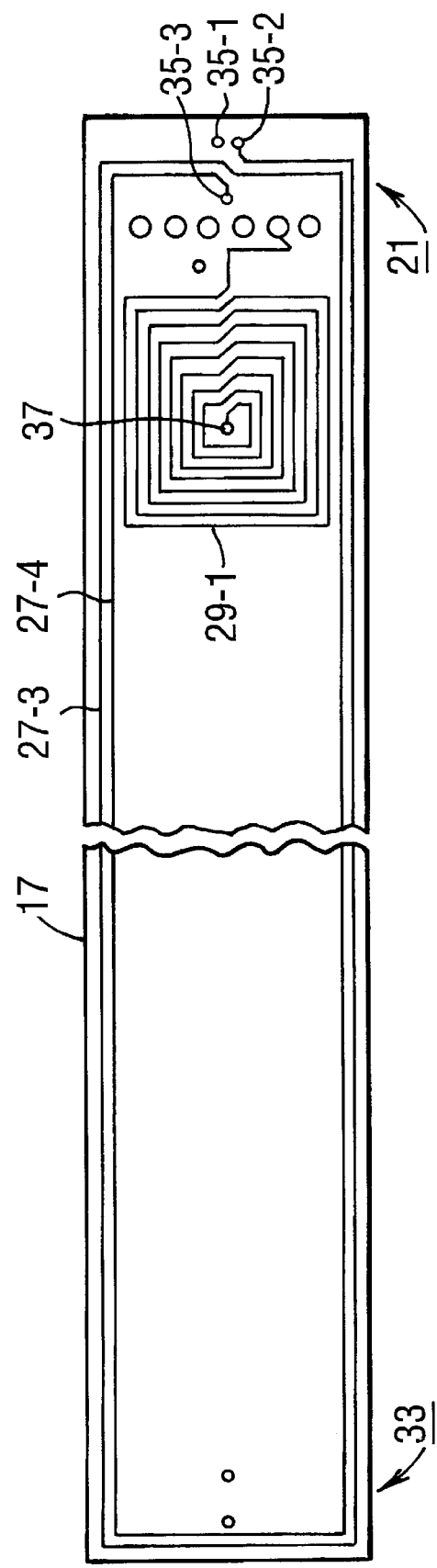

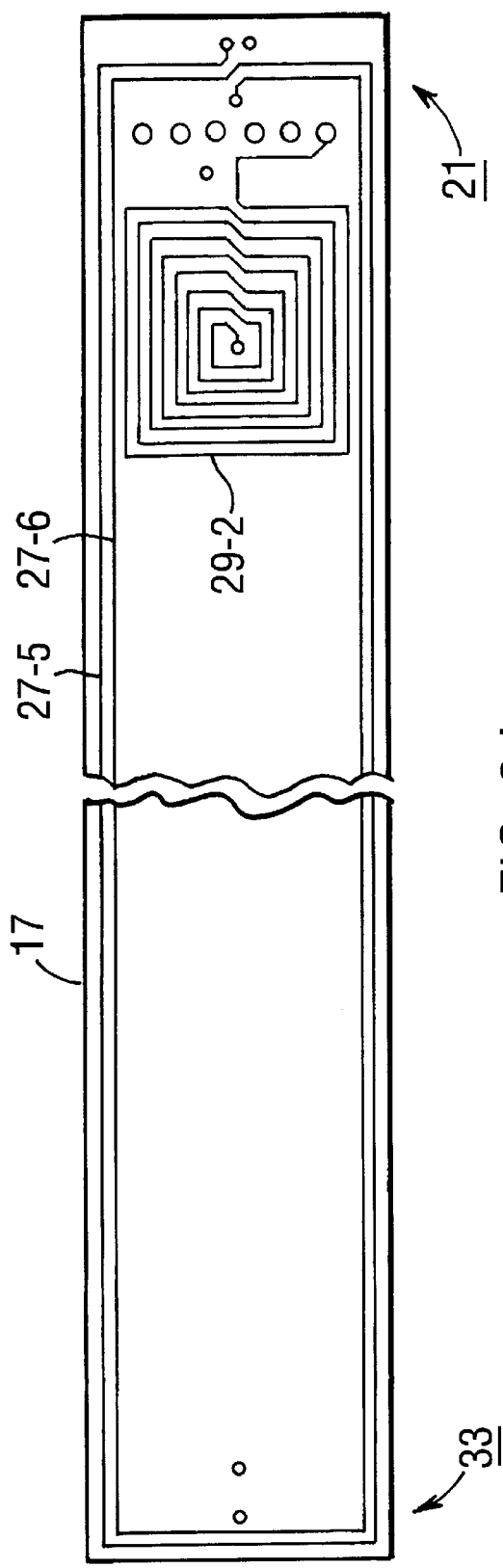
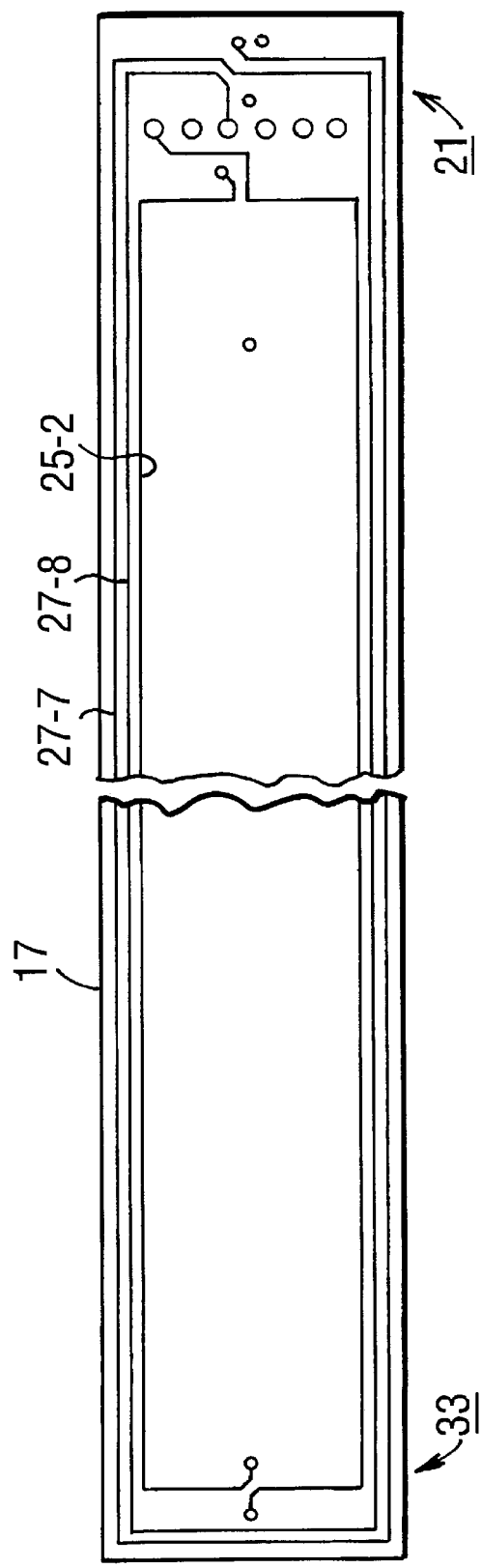

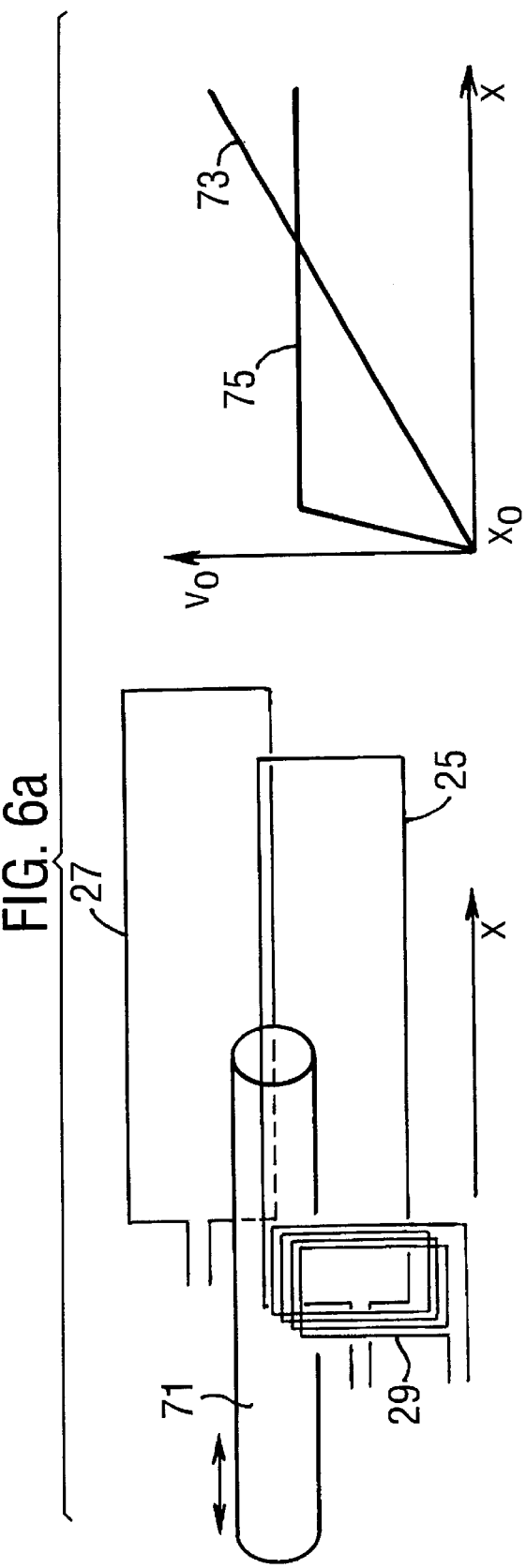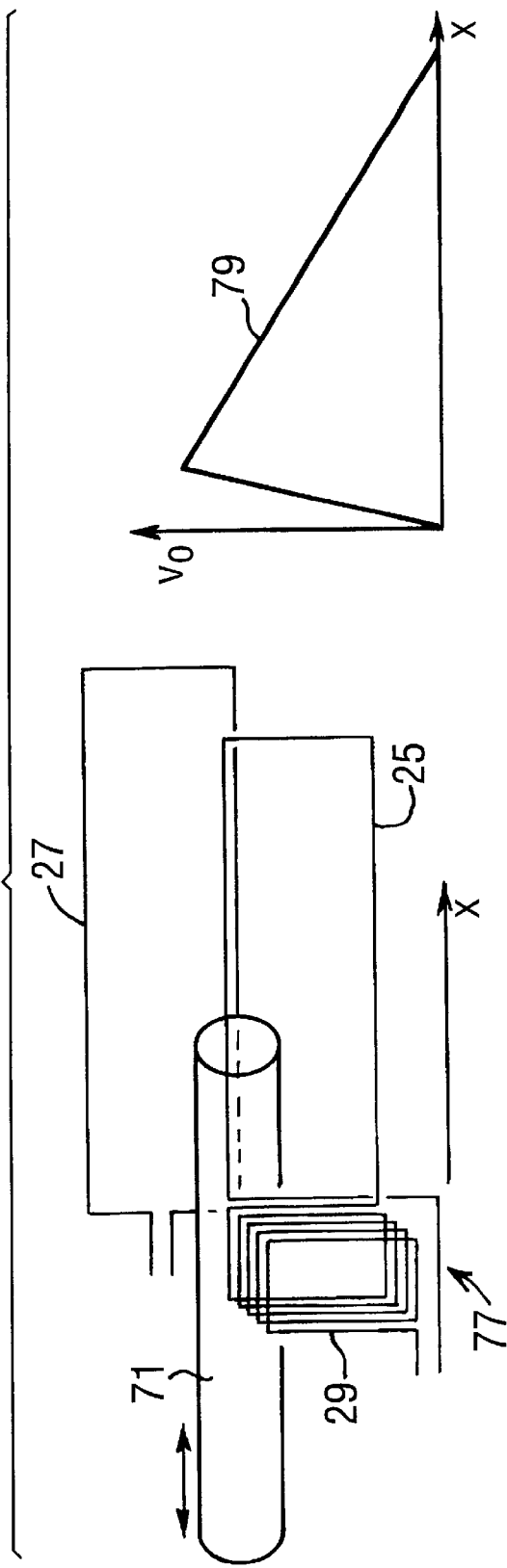

POSITION SENSOR

This is a continuation-in-part of PCT/GB00/01597 filed Apr. 25, 2000.

The present invention relates to electromagnetic position sensors generally. The invention has particular, although not exclusive relevance to inductive position sensors for use in a piston and cylinder assembly.

Several conventional sensing techniques are currently used for industrial cylinder position measurement. These include linear variable differential transformer (LVDT) systems, magnetostrictive time of flight systems and optical position sensors. The main problem with these existing systems is that they are relatively expensive (more than $100) to install in a hydraulic or pneumatic cylinder. Additionally, a particular disadvantage of the LVDT sensor is that the sensor body must be longer than the maximum stroke and therefore, incorporating this sensor into a hydraulic or pneumatic actuator usually involves a significant amount of redesign of the cylinder including the attachment of an additional member onto the piston. Another problem with the LVDT system is that it is relatively sensitive to alignment between the excitation and sense coil and to temperature variations of the cylinder.

One aim of the present invention is to provide an alternative sensing system for use in a piston and cylinder assembly which is relatively simple in operation and which can be produced at low cost and can be easily integrated into the cylinder without significant modification to the mechanical design.

According to one aspect, the present invention provides a position sensor comprising: an excitation winding, a sensor winding, a compensation winding and an electromagnetic field modifying member; wherein the field modifying member and the windings are relatively movable over a measurement path and are arranged so that the electromagnetic coupling between the excitation winding and the sensor winding varies as a function of the relative position of the field modifying member and the windings; and arranged so that the electromagnetic coupling between the excitation winding and the compensation winding does not vary with the relative position between the field modifying member and the windings. In this way, the signal output from the compensation winding can be used to compensate for variations in the signal output from the sensor winding due to, for example, temperature variations in the position sensor system. The output from the compensation winding can be used in addition or alternatively to stabilise an excitation signal which is applied to the excitation winding.

Preferably, the windings are substantially planar and the modifying member is mounted relative to the windings so that there is rotational symmetry between the windings and the modifying member. In this way, rotation of the field modifying member relative to the windings does not cause a variation in the output signal levels. In a preferred embodiment, the windings are formed by copper tracks formed on a number of layers of printed circuit board, since PCB techniques allow accurate alignment and positioning of the windings relative to each other and relative to the field modifying member.

According to another aspect, the present invention provides a position sensor comprising: an electromagnetic field modifying member; a winding electromagnetically coupled to said field modifying member, for generating an electromagnetic field; and drive means for applying an excitation signal to said winding; wherein said field modifying member and said winding are relatively movable along a measurement direction between a first position and a second position and wherein said drive means is arranged to apply an excitation signal having a frequency that minimises a change in coupling between eddy currents generated in the field modifying member and the winding between the first and second positions for different operating temperatures.

Embodiments of the present invention will now be described with reference to the accompanying drawings in which:

FIG. 1 is a cross-sectional view of a piston and cylinder assembly which incorporates a sensor system embodying the present invention;

FIG. 2a illustrates the conductive tracks formed on a first layer of a printed circuit board which forms part of the sensor system shown in FIG. 1;

FIG. 2b illustrates the conductive tracks formed on a second layer of the printed circuit board which forms part of the sensor system shown in FIG. 1;

FIG. 2c illustrates the conductive tracks formed on a third layer of the printed circuit board which forms part of the sensor system shown in FIG. 1;

FIG. 2d illustrates the conductive tracks formed on a fourth layer of the printed circuit board which forms part of the sensor system shown in FIG. 1;

Figure 6C:
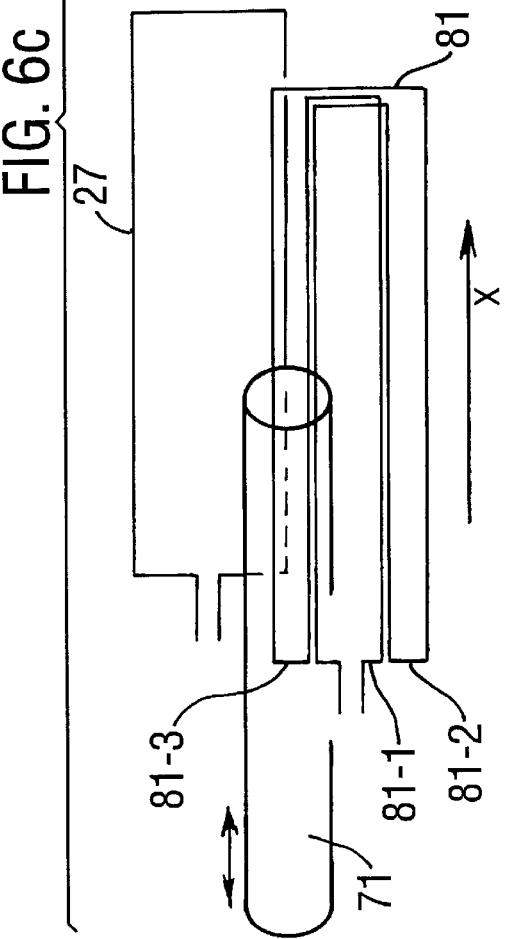
FIG. 6a is a diagrammatic representation illustrating an alternative location for an auxiliary coil which is used in the first embodiment for temperature compensation.
Figure 6D:
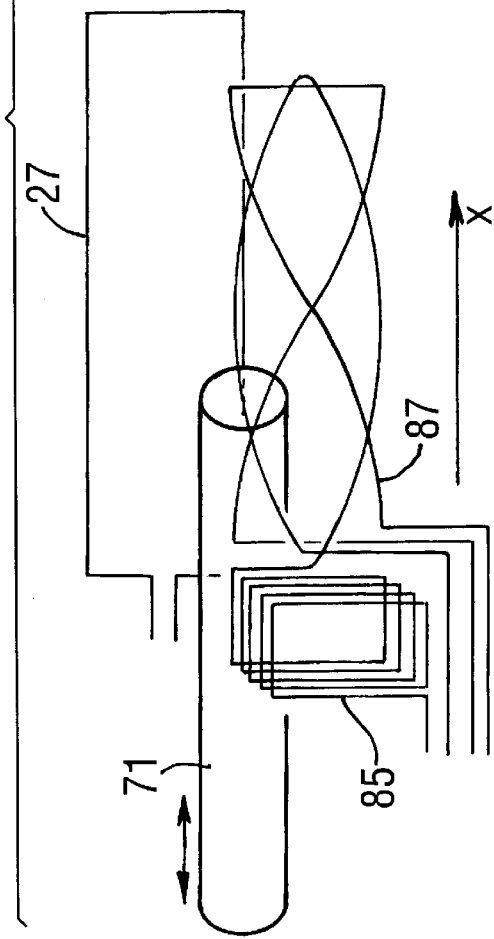
Figure 7A:
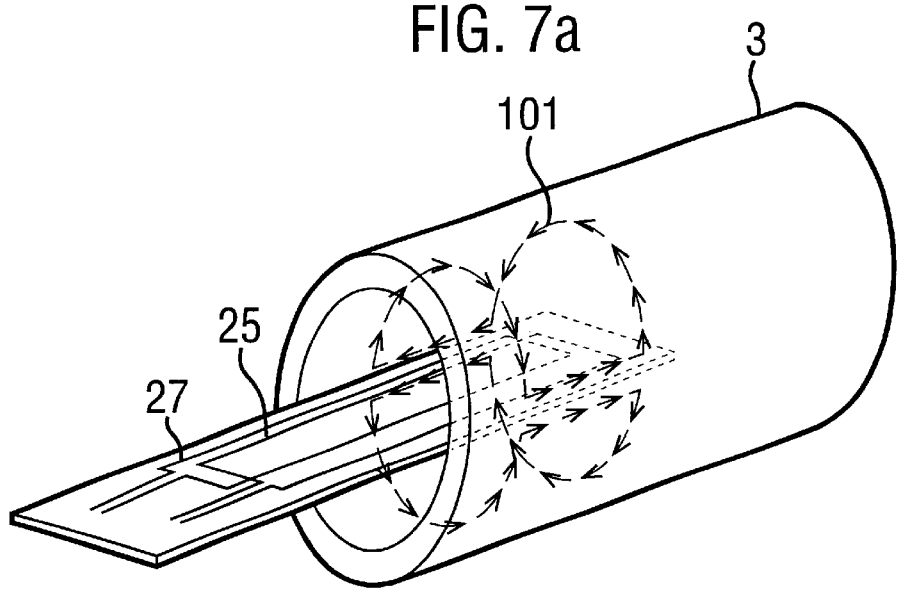
Figure 7B:
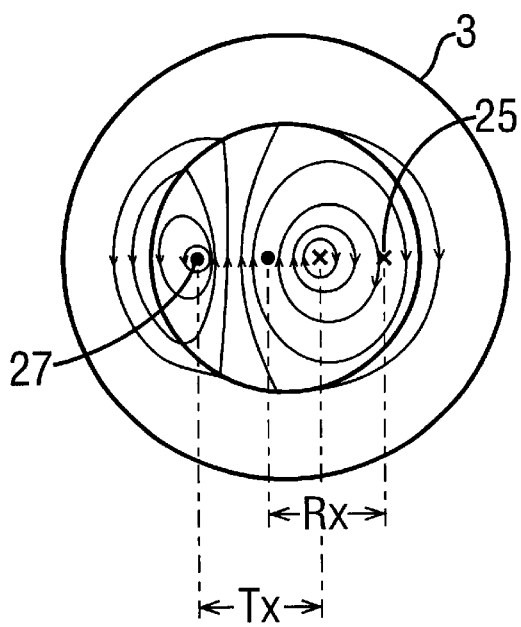
Figure 7C:
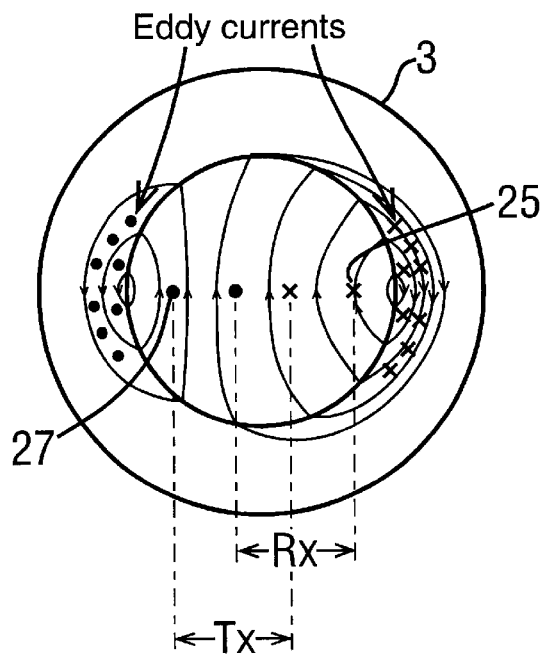

FIG. 6b diagrammatically illustrates an alternative embodiment in which the auxiliary coil is connected in series with the sensing coil but is wound in opposite sense;

FIG. 6c illustrates the form of a second sensor winding which may be used together with the sensor windings shown in FIG. 6b in a position sensor system which performs a ratiometric calculation;

FIG. 6d is a diagrammatic representation of a sensor system which employs two sensor windings which allow a ratiometric calculation to be performed;

FIG. 7a is a diagrammatic representation illustrating an alternative position sensor embodying the present invention;

FIG. 7b is a schematic cross-sectional view illustrating a magnetic field pattern generated by a current flowing in a transmitter winding forming part of the sensor shown in FIG. 7a; and FIG. 7c is a cross-sectional view of the sensor shown in FIG. 7a illustrating the magnetic fields generated by eddy currents caused by current flowing in the excitation winding.

FIG. 1 is a cross-sectional view of a piston and cylinder assembly 1 which includes a sensor system embodying the present invention. As shown, the assembly comprises an elongate cylinder 3 having a central bore 5 in which a piston 7 is reciprocally mounted. The piston 7 includes a piston head 9 whose outer diameter corresponds to the inner diameter of the cylinder bore 5. The movement of the piston 7 within the cylinder 3 is controlled by an actuating member (not shown) which applies force to the end 11 of the piston 7 which extends from the left-hand end 12 of the cylinder 3.

As shown, the piston also has a central bore 13 which receives a support member 15 which provides support for an elongate printed circuit board 17. The support member 15 and the printed circuit board 17 are fixed relative to each other and to the cylinder 3 by means of a mounting plug 19 mounted at the head end 20 of the cylinder 3. The PCB 17 carries an excitation winding (not shown) and at least one sensor winding (not shown) which extend along the length of the PCB 17. In this embodiment, the support member is dimensioned so that the PCB 17 is located along the longitudinal axis of the piston bore 13.

In operation, an excitation current is applied to the excitation winding which generates a magnetic field in the vicinity of the PCB 17. This magnetic field in turn induces a signal in the sensor winding. In this embodiment, the piston 7 is made of steel and, as a result, the signal induced in the sensor winding will vary with the position of the piston 7 within the cylinder. Therefore, by suitable processing of the signal output by the or each sensor winding, the position of the piston 7 within the cylinder 3 can be determined. Since the position sensor is entirely enclosed within the cylinder body 3, the system is not sensitive to electromagnetic interference and does not itself generate electromagnetic interference which may interfere with other electrical systems. Additionally, since the position sensor employs the piston itself to vary the electromagnetic coupling between the sensor and excitation windings, the position sensor can be implemented within the cylinder assembly with minimum modification and redesign.

Sensor PCB

In this embodiment, a four layer printed circuit board is used which carries both the excitation winding and the sensor winding. In this embodiment, the printed circuit board 17 also carries a compensation winding which, as will be described below, generates a signal which is used to provide temperature compensation. FIGS. 2a to 2d show the pattern of conductor tracks on the four layers of the PCB 17, which form the sensor winding 25, the excitation winding 27 and the compensation winding 29.

As shown in FIG. 2, at the right-hand end 21 of the PCB 17 a number of connection pads 23-1 to 23-6 are provided for connecting the sensor winding 25, the excitation winding 27 and the compensation winding 29 to excitation and processing circuitry (not shown). As shown in FIGS. 2a and 2d, the sensor winding 25 comprises two elongate rectangular loops of conductor formed on the first and fourth layers of the PCB 17. These loops are connected in series at the via holes 31-1 and 31-2 located at the left-hand end 33 of the PCB 17 and are connected to the connection pads 23-1 and 23-2. As shown in FIGS. 2a to 2d, the excitation winding 27 is formed by eight elongate rectangular loops 27-1 to 27-8 of conductor, with two loops being provided on each layer. The ends of the excitation winding 27 are connected to connection pads 23-3 and 23-4 and the loops on the four layers of the PCB 17 are connected in series at the vias 35-1 to 35-3. As shown in FIGS. 2b and 2c, the compensation winding 29 is formed by two spiral wound windings 29-1 and 29-2 formed on the second and third layers of the PCB 17. The ends of the compensation winding 29 are connected to connection pads 23-5 and 23-6 and the windings on the two layers are connected together at the via 37.

In this embodiment, the printed circuit board 17 is mounted within the cylinder so that the right-hand end 21, including the compensation winding 29, is located within the mounting plug 19. In this way, the coupling between the excitation winding 27 and the compensation winding 29 is not affected by the position of the piston 7. Therefore, variations in the coupling to the compensation winding 29 will be due to environmental changes, such as changes in the temperature of the cylinder 3. In contrast, since both the excitation winding 27 and the sensor winding 25 extend along the longitudinal axis of the cylinder 3, the electromagnetic coupling between them will depend upon the position of the piston 7 within the cylinder. In this embodiment, with the uniform shape of the excitation winding 27 and the sensor winding 25, this variation is linear, with minimum coupling occurring when the piston is fully inserted into the cylinder and with maximum coupling occurring when most of the piston is withdrawn out of the cylinder 3. These positions will hereinafter be referred to as the "in-position" and the "out-position" respectively.

Figure 3:
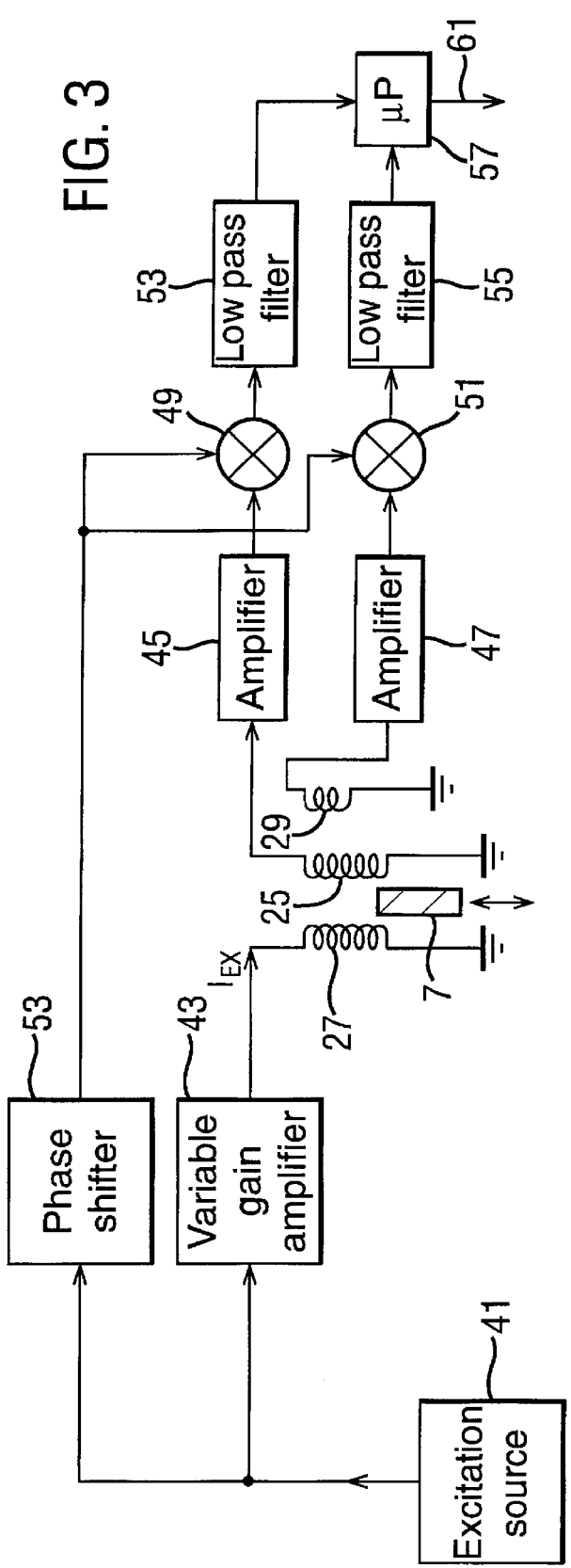
FIG. 3 is an electrical equivalent circuit of the position sensor employed in FIG. 1 and illustrating the electrical components used to determine the position measurement.

FIG. 3 is an electrical equivalent circuit of the position sensor employed in the piston and cylinder assembly shown in FIG. 1 and which shows the excitation and processing circuitry used to determine the position of the piston 7 within the cylinder 3. As shown, the excitation circuitry includes an excitation source 41 which outputs an alternating current $I_{Ex}$ which is applied to the excitation winding 27 via a variable gain amplifier 43. In this embodiment, the excitation current applied to the excitation winding 27 has a peak amplitude of approximately 100 mA and has a frequency of 38 kHz. This generates a magnetic field around the sensor winding 25 and the compensation winding 29 which induces a signal in each of those windings. As the piston 7 changes position, the magnetic coupling between the excitation winding 27 and the sensor winding 25 alters due to the changing amount of steel (the piston) in the vicinity of the sensor winding 25. As a result, the magnitude of the signal coupled from the excitation winding 27 to the sensor winding 25 depends upon the position of the piston 7 within the cylinder 3. However, as mentioned above, since the compensation winding 29 is located within the mounting plug 19, movement of the piston 7 does not affect the coupling between the excitation winding 27 and the compensation winding 29. Therefore, there should be a constant coupling between the two.

As shown in FIG. 3, the signals induced in the sensor winding 25 and the compensation winding 29 are applied to a respective amplifier circuit 45 and 47. The amplified signals are then synchronously detected by mixing them with a nominally 90° phase shifted version of the excitation signal in the mixers 49 and 51 respectively. As shown in FIG. 3, this 90° phase shift is achieved by passing the excitation signal through a phase shifter circuit 53. As those skilled in the art will appreciate, the 90° phase shift is required since the signals induced in the sensor winding 25 and the compensation winding 29 by the magnetic field generated by the excitation winding 27 are 90° out of phase with respect to the excitation current $I_{Ex}$. The outputs from the mixers 49 and 51 are then filtered by respective low pass filters 53 and 55 in order to remove the time varying components and to leave just DC components which vary with the amount of coupling between the excitation winding 27 and the sensor winding 25 (and hence will vary with the piston position) and between the excitation winding 27 and the compensation winding 29 respectively. These DC values are then passed to a microprocessor 57 which includes an analogue to digital converter at its input to convert these DC signals into corresponding digital signals. The microprocessor 57 then processes these signals to identify the current position of the piston 7 within the cylinder 3.

Figure 4:
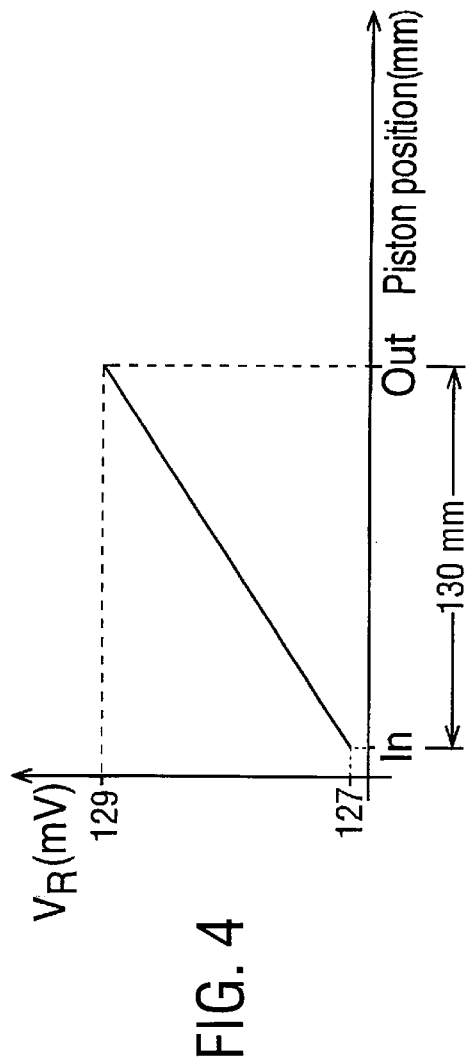
FIG. 4 is a plot illustrating the way in which the signal output from the sensor varies with the position of the piston within the cylinder.

FIG. 4 shows the way in which the signal output by the low pass filter 53 varies with the position of the piston 7 within the cylinder 3. As shown, when the piston 7 is in the in-position and with the above 100 mA excitation current at 38 kHz, the output voltage from the filter 53 is approximately 127 millivolts and when the piston is in its out-position the output voltage from the filter 53 is approximately 129 millivolts. With the same excitation current and frequency, a voltage of approximately 8.4 mV was output from the low pass filter 55 for all positions of the piston 7. In this embodiment, the distance between the in-position and the out-position is approximately 130 mm.

The signal output by the compensation winding 29 can be used in a variety of ways to compensate for variations in the signal induced in the sensor winding 25 due to, for example, temperature variations within the cylinder 3. For example, the compensation may be to correct for both gain and offset variations caused by temperature changes to the cylinder assembly. In this embodiment, the microprocessor 57 includes a lookup table (LUT) which relates the signal obtained from the compensation winding 29 to an appropriate compensation value or values which should be applied to the signal received from the sensor winding 25. This LUT is generated in advance for the particular piston and cylinder assembly by operating the assembly at various known operating temperatures and piston positions and determining appropriate compensation values which, when applied to the signal received from the sensor winding 25 ensures that the determined piston position corresponds to the actual piston position.

These compensation values are then stored with the corresponding signal value obtained from the compensation circuit 29, so that, in use, the appropriate compensation values can be retrieved from the lookup table using the signal received from the compensation circuit 29.

In this embodiment, based on the determined piston position and a stored program (not shown), the microprocessor 57 outputs a control signal 61 to an appropriate control circuit (not shown). The control signal 61 may be used, for example, in a feedback control loop to control the position of the piston 7 within the cylinder 3. This would therefore allow the user to control directly the position of the piston without the user having to regulate or vary the pressure on the cylinder, since this would be automatically adjusted by the closed loop feedback controller.

Frequency Selection

In the above embodiment, the processing electronics were arranged to detect the amount of signal induced in the sensor winding 25 by the magnetic field generated by the excitation current flowing in the excitation winding 27. In addition to this "direct coupling" component which is induced in the sensor winding 25, an "indirect coupling" component is also induced in the sensor winding 25 which also varies linearly with the position of the piston 7. This indirect coupling component is caused by eddy currents which are generated on the inner bore surface of the piston 7 by the excitation magnetic field. In particular, the magnetic field generated by the excitation current ($I_{Ex}$) flowing in the excitation winding 27 induces an EMF in the steel piston 7 which causes eddy currents to flow on the inner bore surface of the piston 7. These eddy currents generate their own magnetic field which induces the above-mentioned indirect component in the sensor winding 25. This indirect component will be 90° phase shifted relative to the direct component and will be 180° phase shifted relative to the excitation current. Mathematically, the indirect component of the EMF induced in the sensor winding 25 can be expressed as follows:

$$V_R^I = \frac{-\omega^2 M_{Tx}^S M_S^{Rx}}{R_S} \cdot I_{Ex} \qquad (1)$$

where $\omega$ is equal to $2\pi$ times the excitation frequency, $M_{Tx}^S$ is the mutual coupling between the excitation winding 27 and the steel piston 7 (which depends mainly on geometric factors), $M_S^{Rx}$ is the mutual coupling between the steel piston 7 and the sensor winding 25 (which again depends mainly on geometric factors) and $R_S$ is a resistance term of the steel piston 7. From the form of equation (1) above, it would seem that it would be best to use a high operating frequency ($\omega$) since this will provide the biggest output signal levels. However, since this indirect component is generated from eddy currents flowing on the inner bore surface of the steel piston 7, the resistance term on the denominator is in effect a skin resistance which also varies with the excitation frequency. In particular, as the excitation frequency increases, this resistance term increases. Additionally, this resistance term also depends on the conductivity of the piston material which varies significantly with temperature. In particular, when the temperature increases the conductivity decreases, which causes this resistance term to increase and when the temperature decreases the conductivity increases, which causes this resistance term to decrease. The inventors have analysed this effect and have found that for this indirect component, for any given system, there is a predetermined operating frequency range which minimises the effects of temperature variations of the system. The inventors have also found that this is not the case for the direct component.

Figure 5A:
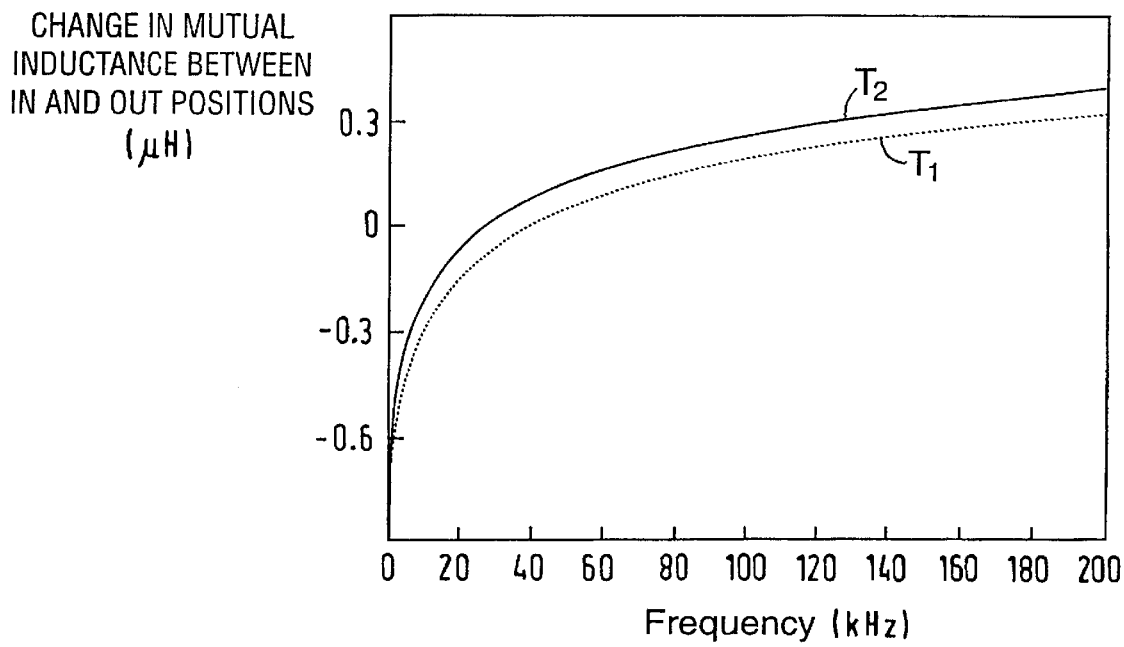
FIG. 5a is a plot illustrating the way in which a performance measure of the position sensor varies for different operating frequencies and for different operating temperatures, when a first type of signal is being measured.

This effect will now be explained in more detail with reference to FIG. 5. In particular, FIG. 5a is a plot showing the way in which the change in mutual inductance between the excitation winding 27 and the sensor winding 25 between the in and out positions of the piston 7, varies for different excitation frequencies and for two different operating temperatures ($T_1$ and $T_2$, where $T_1 > T_2$). In particular, FIG. 5a is a plot of:

$$\frac{1}{\omega}\left(\left[\frac{V_R^D}{I_{Ex}}\right]_{IN} - \left[\frac{V_R^D}{I_{Ex}}\right]_{OUT}\right) \qquad (2)$$

(where $V_R^D$ is the above-described direct component of the EMF induced in the sensor winding 25) for different operating frequencies and temperatures. As those skilled in the art will appreciate, if this difference varies, then the gradient of the linear variation of the induced signal with the piston position will also vary. As shown in FIG. 5a, the change in the mutual inductance between the in and out positions of the piston 7 is different for different operating temperatures over the entire usable frequency band. Therefore, the gradient of the plot shown in FIG. 4 will vary with both the operating frequency and the operating temperature. Consequently, both gain and offset compensation will be required to maximise system accuracy.

Figure 5B:
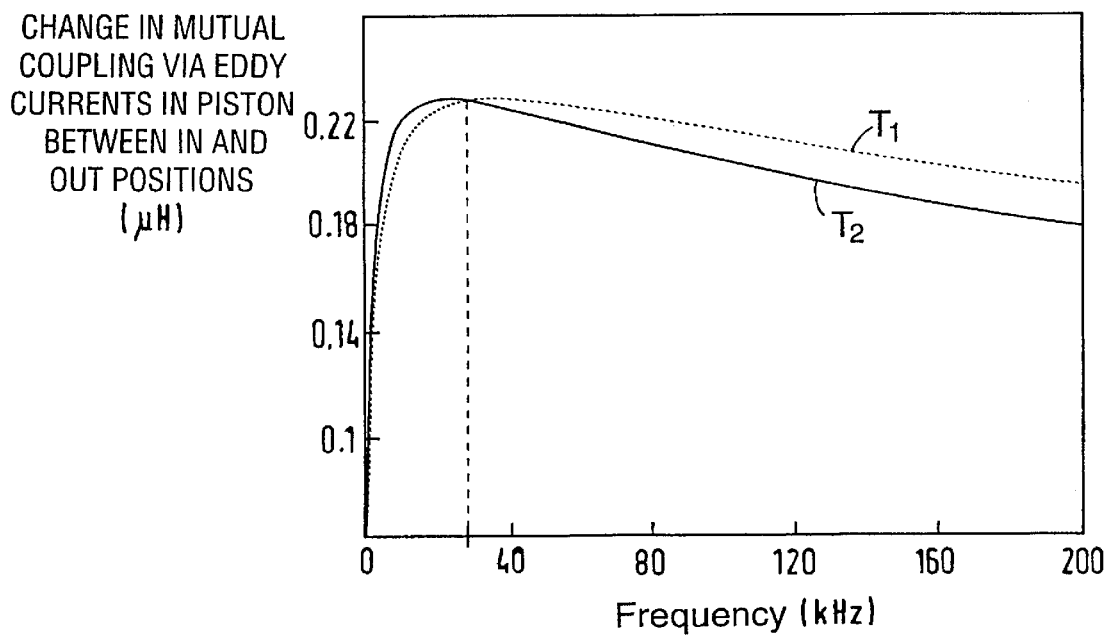
FIG. 5b is a plot illustrating the way in which a performance measure of the position sensor for different operating frequencies and for different operating temperatures, when a second type of signal is being measured.

FIG. 5b is a plot showing the way in which the change in the mutual coupling between the eddy currents in the piston and the sensor winding 25 between the in and out positions of the piston, varies for different excitation frequencies and for two different operating temperatures ($T_1$ and $T_2$, where $T_1 > T_2$). In particular, FIG. 5a is a plot of:

$$\frac{1}{\omega}\left(\left[\frac{V_R^1}{I_{Ex}}\right]_{IN} - \left[\frac{V_R^1}{I_{Ex}}\right]_{OUT}\right) \qquad (3)$$

(where $V_R^I$ is the above-described indirect component of EMF induced in the sensor winding 25) for different operating frequencies and temperatures. As shown, the change in the mutual coupling between the in and out positions of the piston 7 is the same for the two different operating temperatures when the operating frequency is approximately 38 kHz. Although FIG. 5*b* shows the way in which this change in coupling between the in and out positions varies with the excitation frequency for two different operating temperatures, the plot for other operating temperatures all have a similar form and all intersect around the peaks in the plot which, for the two temperature plots shown in FIG. 5*b*, is at around 38 kHz. Therefore, if the excitation frequency is chosen to be approximately 38 kHz and the indirect component is detected, then the gradient of the linear variation of the induced signal with the piston position will vary to a lesser degree with temperature than if a different operating frequency were used. Consequently, position sensing accuracy can still be maintained even if gain compensation is omitted.

The reason for this will now be explained. The above described indirect coupling component varies with excitation frequency ($\omega$) according to $\omega/R_S$, where $R_S$ is the skin resistance of the piston. At small excitation frequencies, $R_S$ is essentially constant and therefore the indirect coupling increases linearly with excitation frequency. However, at higher frequencies, $R_S$ increases rapidly due to the decreasing skin depth of the piston wall. Therefore, the indirect coupling component eventually decreases at higher frequencies and reaches a maximum at some intermediate frequency. A mathematical analysis has revealed that if the skin depth in the piston is substantially smaller than the distance between the windings and the inner piston wall, then the indirect coupling component will depend in a common way on both the excitation frequency and the material parameters of the piston and in particular on the piston's conductivity ($\sigma$) and its permeability ($\mu$). To be precise, the indirect coupling component depends on the quantity:

$$\frac{\omega \sigma}{\mu} \qquad (4)$$

Therefore, a change in either $\sigma$ or $\mu$ with temperature can be compensated by a change in excitation frequency, $\omega$. This is evident from FIG. 5*b* where the plots of the indirect coupling component at two different temperatures only differ by a scaling of the frequency axis. Consequently, if the excitation frequency is chosen so that the indirect coupling component varies least with frequency, i.e. the frequency at which the indirect coupling component is maximum, then the indirect coupling component will also vary least with the material parameters $\sigma$ and $\mu$ and hence will vary least with temperature. In practice, since the frequency at which the indirect coupling component is maximum will vary with temperature, as shown in FIG. 5*b*, consideration must be given to the practical operating temperature range at which the position sensor will operate with an appropriate frequency being chosen so as to minimise the change in the indirect coupling component between the in and out piston position for different operating temperatures.

Although operating the system at this excitation frequency reduces the variation of the gradient of the plot shown in FIG. 4, offsets in the signals still occur due to temperature variation. Therefore, if the indirect component is being detected, then use of the compensation winding 29 in the manner described above is still recommended, although not essential. If the compensation winding 29 is used, then either the mounting plug 19 should be made of the same material as the piston so that the compensation winding 29 will also experience the indirect coupling component via eddy currents induced in the mounting plug 19 or, the compensation winding 29 should be located at the left-hand end of the PCB 17 so that it is always enclosed within the piston 7 and hence should output a constant signal irrespective of the piston position. In practice, it is preferable to include the compensation circuit within the mounting plug 19, since small variations in the surface material of the piston 7 will cause slight variations in the output of the compensation winding 29 as the piston moves.

Alternative Embodiments

In the above embodiment, a single sensor winding was used to provide an output signal which varied with the position of the piston 7 within the cylinder 3 and a compensation winding 29 was used to provide an output signal which was independent of the position of the piston 7. The signal from the compensation winding 29 was used to compensate for variations in the sensor output caused by temperature variations and the like. Although not essential, the use of this type of compensation winding is preferred since temperature variations within the cylinder assembly can significantly reduce the accuracy of the position sensor.

Another technique to reduce the system's sensitivity to misalignment of the windings and temperature variations is to use windings which will allow a ratiometric calculation to be performed by the microprocessor 57. However, the windings normally used for ratiometric position sensing are normally for use with small magnetic elements and are not suited for sensing an extended or elongate element that overlaps the windings by a variable amount, such as the piston 7 of the cylinder assembly shown in FIG. 1. An example of this type of prior art ratiometric position sensing system can be found in U.S. Pat. No. 4,737,698.

If the magnetic coupling between the excitation winding and the sensor winding in the absence of the magnetic element is $K_0$ and the additional coupling due to a small magnetic element of width dx at position x in the measurement direction is k(x)dx, then the coupling between the excitation winding and the sensor winding when an elongate element overlaps the sensor winding up to position x is given by:

$$K(x) = K_0 + \int_0^x k(u)du \qquad (5)$$

In the case where the transmit winding is a long rectangle generating a relatively uniform magnetic field (such as the transmit winding of the fist embodiment), k(x) is proportional to the width of the sensor winding at position x and the integral term is proportional to the area of the sensor winding covered by the magnetic element. Therefore, in the first embodiment, since the sensor winding is also rectangular k(x) is constant and therefore K(x) will increase linearly with x. If, however, the sensor winding is triangular so that k(x) varies linearly with x, then K(x) will increase quadratically with x.

In a system with two sensor windings with couplings between the excitation winding and each of the sensor windings being given by:

$$K_1(x) = K_1 + \int_0^x k_1(u)\,du, \qquad (6)$$

$$K_2(x) = K_2 + \int_0^x k_2(u)\,du$$

then the ratio between the couplings initially changes at a rate that depends on $K_1$, $k_1(0)$, $K_2$ and $k_2(0)$. However, the direct coupling terms between the excitation winding and the sensor windings ($K_1$ and $K_2$) typically depend on different factors to the couplings induced by the magnetic element (i.e. $k_1$ and $k_2$). For example, the direct couplings are very sensitive to the alignment of the excitation winding and the sensor windings, whereas the indirect couplings are sensitive to the material parameters of the magnetic element and hence to things like temperature. For this reason, it is preferable to use sensor windings which are "balanced", where the direct couplings $K_1$ and $K_2$ are zero. Examples of such balanced windings will be described later.

Considering the coupling functions $K_1(x)$ and $K_2(x)$ and ignoring the direct coupling components, then if they both increase linearly, the ratio between them will be constant and the system will be insensitive to the position of the magnetic element. This can be overcome by taking the ratio of the signals from a rectangular sensor winding (for which $K(x)$ will increase linearly with x) and a triangular sensor winding (for which $K(x)$ will increase quadratically with x). However, a signal that increases quadratically with x is very small for small x and so is very susceptible to stray signals and noise.

This can be overcome by placing the above described compensation winding at the start of the position sensing range, i.e. at the left had side of the piston shown in FIG. 1, and taking the ratio of the signals output by the sensor winding and the compensation winding. FIG. 6a diagrammatically shows such a position sensing system. In particular, FIG. 6a shows the spiral wound compensation winding 29, the rectangular sensor winding 25 and the excitation winding 27. FIG. 6a also shows an elongate magnetically permeable rod 71 which is moveable relative to the windings in the x-direction shown in the figure. FIG. 6a also shows a plot of the output voltages 73 and 75 (after demodulation and filtering) from the sensor and compensation windings respectively, showing the way in which they vary with the position of the rod 71. As shown, the voltage output from the compensation winding 29 increases rapidly until $x_0$ and then stays constant over the remainder of the position measurement range. In contrast, the signal output by the sensor winding 25 increases linearly with x. Therefore, if the position sensing range is limited to values of x that are above $x_0$, then the microprocessor 57 can take the ratio of the received voltages to give a measure of the rod position which is less sensitive to temperature variations and the like.

As mentioned above, the use of "balanced" sensor windings is preferred since the direct coupling component from the excitation winding to the sensor winding will be zero. FIG. 6b shows how such a balanced sensor winding can be formed by connecting the compensation winding 29 in series with the sensor winding 25, so that EMFs induced in the compensation winding 29 oppose EMFs induced in the sensor winding 25. The resulting winding 77 will be approximately balanced if the turns area product of the compensation winding 29 and the sensor winding 25 are the same. FIG. 6b also shows a plot of the output voltage 79 (after demodulation and filtering) from the winding 77, showing the way in which it varies with the position of the rod 71. As shown, the output voltage initially ramps up as the rod moves past the compensation winding portion 29 and then ramps down as it moves past the rest of the winding. By limiting the measurement range to the region outside the initial turns, the output voltage from this winding varies linearly with the rod position.

Another sensor winding can then be used to provide a robust ratiometric measurement of the rod position. FIG. 6c illustrates the form of another balanced sensor winding 81 that can be used together with the winding shown in FIG. 6b. As shown, the winding has a central turn 81-1 that primarily couples via the rod 71 and two side turns 81-2 and 81-3 which couple less with the rod and which are wound in the opposite sense and make it balanced with respect to the excitation winding 27 in the absence of the rod 71. As shown in FIG. 6c, the output voltage 83 from the winding 81 increases linearly with x. Therefore, if the two sensor windings in FIG. 6b and 6c are used together, then beyond the region occupied by the initial turns of the sensor winding 77, the quantity:

$$\frac{(K_2(x) - K_1(x))}{(K_2(x) + K_1(x))} \qquad (7)$$

increases linearly with x and is insensitive to variations in the material properties of the rod 71 and misalignment between the excitation winding and the sensor windings.

FIG. 7 illustrates another layout for the excitation winding 27 and the sensor winding 25 which are "balanced" i.e. in which there is no direct coupling between the excitation winding 27 and the sensor winding 25. As shown in FIG. 7a, in this embodiment, this is achieved by staggering or overlapping the excitation winding 27 and the sensor winding 25. FIG. 7a also shows the path of the eddy currents 101 induced in the wall of the cylinder 3 as a result of current flowing in the excitation winding 27. FIGS. 7b and 7c show cross-sectional views of the sensor shown in FIG. 7a at a point where the cylinder 3 covers the sensor winding 25 and the excitation winding 27. FIG. 7b also shows the lines of the magnetic field generated by the current flowing in the excitation winding 27. As can be seen from the field lines shown in this figure, the net flux through the sensor winding 25 is zero because the flux to the left and right of the excitation wire line over the middle of the sensor winding 25 flows in different directions. In fact, the magnetic field in the vicinity of the excitation winding 27 has a similar pattern even in the absence of the cylinder 3, such that the net flux through the sensor winding 25 is always small. That is, the direct coupling component from the excitation winding 27 to the sensor winding 25 is small for all positions of the movable member.

FIG. 7c shows the eddy currents induced in the cylinder 3 and the lines of magnetic field that they generate, which is 90° out of phase with the field generated by the excitation winding 27. As can be seen, the flux through the sensor winding 25 flows in the same direction across the whole width of the sensor winding 25 and therefore generates a large "eddy current" signal in the sensor winding 25. As in the above embodiments, the size of this signal induced in the sensor winding is essentially proportional to the length of the windings covered by the cylinder 3, so that the output signal from the sensor winding 25 provides a linear measurement of the position of the movable member.

As those skilled in the art will appreciate, there are various ways in which such "balanced" overlapping excitation and sensor windings may be provided. In the illustration shown in FIG. 7a, the excitation winding 27 and the sensor winding 25 lie in substantially the same plane. This is not essential. The sensor winding and the excitation winding may be provided on different planes, for example on either side of the printed circuit board.

There are a number of other ways of using sensor windings that can be used to provide a ratiometric measurement. For example, any pair of sensor windings used to provide a ratiometric measurement in a system for sensing the position of a small magnetic element, can be converted into a pair of sensor windings for use in a system that measures the position of an elongate overlapping magnetic element that uses the same ratiometric measurement. In particular, if the coupling between the excitation winding and the two sensor windings for the small magnetic element at position x is $C_1(x)$ and $C_2(x)$, then in the system with an overlapping magnetic element an equivalent response is obtained by using two sensor windings with initial turns providing a coupling $C_1(0)$ and $C_2(0)$ respectively and an additional coupling at each position x of:

$$k_1(x) = \frac{dC_1(x)}{dx},$$
$$k_2(x) = \frac{dC_2(x)}{dx}$$

(8)

respectively. For Example, U.S. Pat. No. 4,737,698 discloses a system for detecting the position of a small magnetic element where $C_1(x)$ and $C_2(x)$ are sinusoidal and cosinusoidal respectively and the position of the element is determined using the ratiometric function $\text{atan}(C_1(x)/C_2(x))$. An equivalent system using an overlapping magnetic element is formed by using a first sensor winding having a set of initial turns followed by a single turn with a sinusoidal coupling response and a second sensor winding with no initial turns and a cosinusoidal coupling response. By making the windings an odd number of half wavelengths, both will be balanced with respect to an excitation winding that transmits an essentially uniform magnetic field. Such a system is diagrammatically shown in FIG. 6*d* in which both sensor windings 85 and 87 extend for one half of a wavelength. FIG. 6*d* also shows the way in which the output voltages 89 and 91 (after demodulation and filtering) vary with the position of the rod 71.

In the embodiments shown in FIG. 6, the excitation winding and the sensor windings were located on either side of the-moveable rod 71. As skilled in the art will appreciate, the windings could all be located on one side of the rod, such as in the first embodiment where the windings were substantially coplanar.

In the first embodiment, the signals from the sensor winding and from the compensation winding were both processed through a separate processing channel. In an alternative embodiment, the two signals could be multiplexed through a common processing channel. Alternatively, the signal from the compensation winding might not be processed in the same way. For example, the signal from the compensation winding could be rectified and then integrated over a predetermined period to provide a compensation signal for the microprocessor.

In the above embodiment, a steel piston was used which modified the coupling between an excitation winding and a sensor winding. As those skilled in the art will appreciate, other materials can be used for the piston which will still cause the piston to interact with the magnetic field generated by the excitation winding so that a signal which varies with the piston position will be induced in the sensor winding. Essentially, the piston material can be made of a material that is either (i) electrically conductive but not magnetically permeable, (ii) magnetically permeable but not electrically conductive; or (iii) both electrically conductive and magnetically permeable. As those skilled in the art will appreciate, the way in which the signal output from the sensor winding will vary with the position of the piston will depend upon the material used for the piston. For example, if the piston is made of ferrite, then the coupling between the excitation winding and the sensor winding will increase as there is more overlap between the windings and the piston. However, if a ferrite piston is used, then there will be no eddy currents and therefore only the direct coupling component will be present.

In the above embodiments, an excitation winding was used to generate a magnetic field which couples into a compensation winding and a sensor winding. In an alternative embodiment, the sensor and compensation windings may be driven with the excitation current and the signals induced in the excitation winding can be used to determine the position of the magnetic element. In a further alternative, the excitation winding may be dispensed with. In such an embodiment, the sensor and compensation windings would be driven with an excitation current and the position determined from a direct measure of the inductance of the windings.

As those skilled in the art will appreciate, the specific number of turns and location of the windings of the first embodiment described above are not essential to the present invention. In particular, it is not essential to have eight turns of excitation winding and two turns of sensor winding or to have the excitation winding loop around the outside of the sensor winding. Various alternative geometries and turns may be employed.

In the above embodiment, an excitation frequency of 38 kHz was chosen in order to minimise the change of coupling between eddy currents flowing in the piston and the sensor winding between the in and out position of the piston. As those skilled in the art will appreciate, this particular choice of excitation frequency is specific to the particular geometry and materials of the piston employed in that embodiment. If the geometry of the windings is changed or the material of the piston is changed, this optimum operating frequency will also change.

In the above embodiment, the sensor printed circuit board extended from a head end of the cylinder into a bore of the piston. In a preferred embodiment, the sensor PCB is mounted within a protective cylinder made of, for example, plastic. A thin shield of aluminium may also be used provided this does not interfere with the electromagnetic coupling between the piston and the sensor windings. The use of such a cylindrical protective cover facilitates the sealing of the inside of the piston since an o-ring seal or the like can simply be mounted around the base of this cover.

In the above embodiment, the signal from the compensation winding was used to compensate for variations in the output from the sensor winding to variations caused by, for example, temperature variations of the cylinder. Since the signal output from the compensation unit will also depend upon the excitation signal, the output from the compensation winding may be used, in an alternative embodiment, to stabilise and normalise the excitation signal.

In the above embodiments, where a signal is induced directly from the excitation winding into the sensor winding and a component is indirectly induced in the sensor winding via the piston, either the electronics detected the direct coupled component or the indirect coupled component. This was achieved either by mixing the signal with a 90° phase shifted version of the excitation current or with a 0° phase shifted version of the excitation current. In an alternative embodiment, the received signal may be mixed with a version of the excitation current which has an intermediate phase such as, for example, 45°. In this case, the output signal will comprise a weighted combination of the direct and the indirect components, with the weighting depending on the phase angle of the mixing signal. Again, in such an embodiment, the excitation frequency may be chosen so as to minimise the change in signal induced in the sensor winding between the in and out position of the piston with different operating temperatures.

A linear position sensor has been described above which is used in a cylinder and piston assembly. The position sensor may be used in hydraulic or pneumatic cylinder systems. It may also be used in shock absorbers, damping cylinders, syringes and the like. Further, as those skilled in the art will appreciate, the position sensor can be used in other applications and many of the features and aspects of the position sensor are applicable in other types of position sensors, such as rotary position sensors. For example, the above described compensation winding and frequency selection may be employed in a system which uses a rotary position sensor.

In the above embodiment, the processing electronics, including a microprocessor, were located on the sensor winding printed circuit board. In an alternative embodiment, the microprocessor may form part of a central processing system and the output from the low pass filters may be connected by wire to this central processing system.

What is claimed is:

1. A position sensor comprising:
   an excitation winding which, when energised, is operable for generating an electromagnetic field;
   a sensor winding electromagnetically coupled to said excitation winding, for sensing electromagnetic fields;
   a compensation winding electromagnetically coupled to said excitation winding; and
   an electromagnetic field modifying member electromagnetically coupled to said excitation winding for modifying the electromagnetic field generated by said excitation winding;
   wherein said field modifying member and said windings are relatively moveable along a measurement direction between first and second positions and are arranged (i) so that the electromagnetic coupling between said excitation winding and said sensor winding varies as a function of the relative position of said field modifying member and said windings between said first and second positions; and (ii) so that the electromagnetic coupling between said excitation winding and said compensation winding does not vary with said relative position between said first and second positions, whereby a signal obtained from said compensation winding can be used to provide compensation for variations in the signal output from said sensor winding which are not caused by said relative position.

2. A sensor according to claim 1, wherein said compensation winding is coupled to said electromagnetic field modifying member.

3. A sensor according to claim 1, wherein said sensor winding and said compensation winding are connected in series and arranged so that an EMP induced in said sensor winding by an electromagnetic field opposes an EMF induced in said compensation winding by the same electromagnetic field.

4. A sensor according to claim 1, which is a linear position sensor and wherein said excitation winding and said sensor winding are elongate and extend between said first and second positions and wherein said compensation winding is located outside a range defined by said first and second positions.

5. A position sensor according to claim 4, wherein said compensation winding is located, in use, adjacent a second field modifying member similar to that of the first electromagnetic field modifying member, which second modifying member is fixed relative to said compensation winding.

6. A position sensor according to claim 1, further comprising drive means for applying said excitation signal to said excitation winding and processing means for processing the signals induced in said sensor winding and said compensation winding to provide an indication of the relative position of said field modifying member and said windings.

7. A position sensor according to claim 6, wherein said processing means is operable to detect a signal induced in said sensor winding directly by the magnetic field generated by said excitation winding.

8. An apparatus according to claim 6, wherein upon energisation of said excitation winding, eddy currents are generated in said electromagnetic field modifying member, which eddy currents are operable to induce a signal in said sensor winding which varies with the relative position between said field modifying member and said sensor winding and wherein said processing means is operable to detect said signal induced in said sensor winding by said eddy currents.

9. An apparatus according to claim 6, wherein upon energisation of said excitation winding, eddy currents are generated in said electromagnetic field modifying member, which eddy currents are operable to induce a signal in said sensor winding which vary with the relative position between said field modifying member and said sensor winding and wherein said processing means is operable to detect a mixture of the signal induced in said sensor winding directly by the magnetic field generated by said excitation winding and the signal induced in said sensor winding by said eddy currents.

10. An apparatus according to claim 6, wherein said drive means is arranged to apply an excitation signal having a frequency that minimises a change in the signal induced in the sensor winding between the first and second positions for different operating conditions.

11. A position sensor according to claim 6, further comprising a second sensor winding electromagnetically coupled to said excitation winding, for sensing electromagnetic fields, said second sensor winding and said field modifying member being relatively movable along said measurement direction between said first and second positions and arranged so that the electromagnetic coupling between the excitation winding and said sensor winding varies as a function of the relative position of said field modifying member and said windings and wherein said processing means is operable to determine the position of said field modifying member relative to said windings using a ratiometric calculation of the signals induced in said first and second sensor windings.

12. A position sensor according to claim 1, wherein said electromagnetic coupling between said excitation winding and said sensor winding varies substantially linearly with the relative position of said field modifying member and said windings.

13. A sensor according to claim 1, wherein said excitation and said sensor windings are elongate and wherein said compensation winding is formed at one end of said excitation winding.

14. A piston and cylinder assembly comprising a cylinder body, a piston movable within a piston cavity within the cylinder body and a position sensor according to any one of claims 1–13 for sensing the position of the piston within the piston cavity, wherein said piston form said field modifying member of said position sensor.

15. A position sensor comprising:
an electromagnetic field modifying member;
an excitation winding which, when energised, is operable for generating an electromagnetic field;
a sensor winding electromagnetically coupled to said excitation winding, for sensing electromagnetic fields; and
a compensation winding electromagnetically coupled to said excitation winding;
wherein said field modifying member and said windings are relatively moveable along a measurement direction and are arranged (i) so that the electromagnetic coupling between said excitation winding and said sensor winding varies as a function of the relative position of said field modifying member and said windings; and (ii) so that a signal obtained from said compensation winding can be used to provide compensation for variations in the signal output from said sensor winding which are not caused by said relative position.

16. A position sensor comprising:
an electromagnetic field modifying member;
an excitation winding electromagnetically coupled to said field modifying member, for generating an electromagnetic field;
a sensor winding electromagnetically coupled to said field modifying member, for sensing electromagnetic fields; and
drive means for applying an excitation signal to said excitation winding;
wherein said field modifying member and said windings are relatively moveable along a measurement direction between a first position and a second position and wherein said drive means is arranged to apply an excitation signal having a frequency that minimises a change in the signal induced in the sensor winding between the first and second positions for different operating conditions.

17. A position sensor comprising:
an electromagnetic field modifying member;
a winding electromagnetically coupled to said field modifying member, for generating an electromagnetic field; and
drive means for applying an excitation signal to said winding;
wherein said field modifying member and said winding are relatively moveable along a measurement direction between a first position and a second position and wherein said drive means is arranged to apply an excitation signal having a frequency that minimises a change in coupling between eddy currents generated in the field modifying member and the winding between the first and second positions for different operating conditions.

18. A position sensor comprising:
an electromagnetic field modifying member;
a first winding electromagnetically coupled to said electromagnetic field modifying member; and
a second winding electromagnetically coupled to said electromagnetic field modifying member;
wherein said field modifying member and said windings are relatively movable along a measurement direction between first and second positions and are arranged (i) so that the electromagnetic coupling between the first winding and the field modifying member varies as a function of the relative position of said field modifying member and said windings between said first and second positions; and (ii) so that the electromagnetic coupling between said second winding and said field modifying member does not vary with said relative position between said first and second positions, whereby a signal obtained from said second winding can be used to provide compensation for variations in a signal output from said first winding which are not caused by said relative position.

19. A position sensor according to claim 18, further comprising drive means for applying a current to said first and second windings and means for detecting the inductance of the first and second windings to produce said respective signals.

20. A linear position sensor comprising:
an elongate electromagnetic field modifying member;
an elongate excitation winding which, when energised, is operable for generating an electromagnetic field; and
an elongate sensor winding electromagnetically coupled to said excitation winding, for sensing electromagnetic fields;
wherein said elongate member and said windings are relatively moveable along a measurement direction and are arranged so that their longitudinal axes are substantially aligned along said measurement direction, whereby the electromagnetic coupling between said excitation winding and said sensor winding varies as a function of the relative position of said elongate member and said windings.

21. A position sensor comprising:
an excitation winding which, when energised, is operable for generating an electromagnetic field;
a first sensor winding electromagnetically coupled to said excitation winding, for sensing electromagnetic fields;
a second sensor winding electromagnetically coupled to said excitation winding, for sensing electromagnetic fields;
a compensation winding electromagnetically coupled to said excitation winding;
an elongate electromagnetic field modifying member electromagnetically coupled to said excitation winding for modifying the electromagnetic field generated by said excitation winding;
wherein said field modifying member and said windings are relatively moveable along the measurement direction so that the electromagnetic coupling between said excitation and said first and second sensor windings varies as a function of the relative position of said field modifying member and said windings; and
means for performing a ratiometric calculation of the signals induced in said first and second sensor windings to determine the position of said field modifying member relative to said windings.

22. A position sensor comprising:
an excitation winding having a loop portion which, when energised, is operable for generating an electromagnetic field;
a sensor winding having a loop portion which partially overlaps the loop portion of said excitation winding;
an electromagnetic field modifying member for modifying the electromagnetic field generated by said excitation winding;

wherein said field modifying member and said windings are relatively movable along a measurement direction between first and second positions and are arranged so that when said excitation winding generates an electromagnetic field: (i) said electromagnetic field modifying member modifies the electromagnetic field; and (ii) said sensor winding senses the modified electromagnetic field to output a signal which varies with the relative position of said field modifying member and said windings between said first and second positions.

* * * * *

UNITED STATES PATENT AND TRADEMARK OFFICE
CERTIFICATE OF CORRECTION

PATENT NO. : 6,642,710 B2
DATED : November 4, 2003
INVENTOR(S) : Euan Morrison et al.

It is certified that error appears in the above-identified patent and that said Letters Patent is hereby corrected as shown below:

<u>Column 13,</u>
Line 62, "EMP" should read -- EMF --.

<u>Column 15,</u>
Line 1, "form" should read -- forms --.

Signed and Sealed this

Thirtieth Day of December, 2003

JAMES E. ROGAN
*Director of the United States Patent and Trademark Office*